United States Patent
Zheng et al.

(10) Patent No.: US 8,265,625 B2
(45) Date of Patent: Sep. 11, 2012

(54) SYSTEMS AND METHODS FOR NETWORK ENTRY MANAGEMENT

(75) Inventors: Yan-Xiu Zheng, Zhudong Township, Hsinchu County (TW); Ming-Bing Chen, Taipei (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 210 days.

(21) Appl. No.: 12/837,956

(22) Filed: Jul. 16, 2010

(65) Prior Publication Data

US 2011/0045858 A1 Feb. 24, 2011

Related U.S. Application Data

(60) Provisional application No. 61/235,480, filed on Aug. 20, 2009.

(51) Int. Cl.
*H04Q 7/20* (2006.01)
(52) U.S. Cl. ...... 455/434; 455/161.1; 455/509; 455/154.1; 455/515; 370/329; 370/342; 370/324
(58) Field of Classification Search ........... 455/507, 455/515, 458, 154.1, 161.1, 150, 434, 509, 455/552.1, 403; 370/329, 252, 342, 311, 370/335, 350, 516
See application file for complete search history.

(56) References Cited

U.S. PATENT DOCUMENTS

| | | | |
|---|---|---|---|
| 7,885,237 B2 * | 2/2011 | Hahm et al. | 370/335 |
| 2009/0042532 A1 * | 2/2009 | Bienas et al. | 455/403 |
| 2010/0220674 A1 * | 9/2010 | Fu | 370/329 |
| 2010/0238825 A1 * | 9/2010 | Zhang et al. | 370/252 |
| 2010/0322090 A1 * | 12/2010 | Zhang et al. | 370/252 |
| 2010/0322291 A1 * | 12/2010 | Kaikkonen et al. | 375/147 |
| 2011/0002283 A1 * | 1/2011 | Drugge et al. | 370/329 |
| 2011/0098074 A1 * | 4/2011 | Seo et al. | 455/509 |
| 2012/0087273 A1 * | 4/2012 | Koo et al. | 370/252 |

FOREIGN PATENT DOCUMENTS

| | | |
|---|---|---|
| EP | 2 031 892 | 3/2009 |
| WO | WO 2008/033985 | 3/2008 |
| WO | WO 2010/048178 | 4/2010 |

OTHER PUBLICATIONS

European Search Report dated Mar. 1, 2012.

* cited by examiner

*Primary Examiner* — Tan Trinh
(74) *Attorney, Agent, or Firm* — Thomas|Kayden (57) ABSTRACT

Systems and methods for network entry management are provided. The system includes a base station and a mobile station. The base station broadcasts synchronization channels (SCH) on multiple carriers, where the SCH may be hierarchical synchronization channel composed of primary synchronization channel (P-SCH) and secondary synchronization channel (S-SCH) which are used for timing, frequency synchronization, cell identification, etc. The carriers include at least a first carrier including at least one P-SCH and do not include a S-SCH. The mobile station scans the first carrier, and checks whether a P-SCH is broadcasted on the first carrier. If a P-SCH is broadcasted on the first carrier, the mobile station checks whether an S-SCH is broadcasted on the first carrier. If no S-SCH is broadcasted on the first carrier, the mobile station scans for a second carrier broadcasted by the base station.

10 Claims, 8 Drawing Sheets

SYSTEMS AND METHODS FOR NETWORK ENTRY MANAGEMENT

CROSS REFERENCE TO RELATED APPLICATIONS

This application claims the benefit of U.S. Provisional Application No. 61/235,480 filed Aug. 20, 2009, the entirety of which is incorporated by reference herein

BACKGROUND OF THE INVENTION

1. Field of the Invention

The disclosure relates generally to systems and methods for network entry management, and, more particularly to systems and methods for network entry management that provide a hierarchical synchronization channel design for a multi-carrier system to reduce network entry latency.

2. Description of the Related Art

Recently, mobile stations, such as mobile devices having wireless communication capabilities have become more and more popular. Due to increased convenience and functions of the mobile devices, these devices have become basic necessities of life.

In a multi-carrier system, when a mobile station powers on, it will scan various carriers based on known channel rasters. In 3GPP 36.101 v9.0.0, the center raster is 100 kHz for all bands. A mobile station may scan synchronization channels on every 100 kHz in each band to discover if there is a 3GPP system. When a band 1 ranges from 2110 MHz to 2170 MHz, a mobile station will scan from 3GPP systems on the carriers 2110 MHz, 2110.1 MHz, 2110.2 MHz, . . . , 2169.9 MHz. Multi-carrier systems may be composed of fully configured carriers and partially configured/extension carriers. The fully configured carriers can operate standalone. The partially configured/extension carriers can not operate standalone, and can not be used for network entry. Currently, hierarchical synchronization channels (SCH) have been adopted by some orthogonal frequency division modulation (OFDM) systems, such as IEEE 802.16m and 3GPP LTE. Hierarchical SCH is composed of a primary synchronization channel (P-SCH) and secondary a synchronization channel (S-SCH). The P-SCH and S-SCH may be time division multiplexed. The P-SCH is used for timing acquisition and frequency synchronization, and is used for symbol boundary detection. The S-SCH may carry a cell identity (cell ID) or partial cell ID information, e.g. Physical ID in a 3GPP LTE. The S-SCH may be used for channel estimation.

Generally, a frame structure may include two P-SCHs and two S-SCHs, and a broadcasting channel (BCH) follows either the P-SCH or S-SCH. The BCH can carry system information, such as a bandwidth, identity, frame configurations, location of control channels, and other system information. The SCH is generally used as an identity for a station to lock onto the system. When a system adopts the hierarchical SCH, a mobile station may detect the P-SCH to synchronize system timing and center frequency, and then the mobile station will detect the S-SCH to acquire complete cell IDs. After, a mobile station can retrieve system information via the BCH. It is understood that, a mobile station will leave the carrier and scan for another carrier if the mobile station can not detect the P-SCH, S-SCH or BCH. It is noted that, a mobile station will scan every carrier within each band to try to lock onto the system. If no related information or mechanism can be provided in the hierarchical SCH, network entry latency will be serious.

IEEE C802.16m_08_1093 proposes a method to reduce network entry latency. It applies different P-SCHs to the fully configured carrier and the partially configured carrier. Therefore, a mobile station can detect the P-SCH to verify if a current carrier is the fully configured carrier. If the current carrier is a partially configured carrier, a mobile station will skip the carrier to scan for another carrier, such that network entry latency can be reduced. However, in IEEE C802.16m_08_1093, the number of P-SCHs has increased. If only three sequences are set for the P-SCHs, it will cause at least a 33% detection complexity overhead. The structure also wastes resources for the S-SCH.

BRIEF SUMMARY OF THE INVENTION

Systems and methods for network entry management are provided.

An embodiment of a system for network entry management includes a base station and a mobile station. The base station broadcasts on multiple carriers. The carriers include at least a first carrier including at least one P-SCH and does not include an S-SCH, wherein the P-SCH may be used for timing acquisition and frequency synchronization, and the S-SCH may be used for cell identification. The mobile station scans the first carrier, and checks whether a P-SCH is broadcasted on the first carrier. If a P-SCH is broadcasted on the first carrier, the mobile station checks whether an S-SCH is broadcasted on the first carrier. If no S-SCH is broadcasted on the first carrier, the mobile station scans a second carrier broadcasted by the base station.

An embodiment of a system for network entry management at least includes a base station. The base station broadcasts on multiple carriers. The carriers are classified into fully configured carriers and partially configured carriers. The fully configured carrier includes at least one P-SCH and at least one S-SCH, and the partially configured carrier includes at least one P-SCH, and does not include the S-SCH. The P-SCH may be used for timing acquisition and frequency synchronization, and the S-SCH may be used for cell identification.

An embodiment of a system for network entry management at least includes a mobile station. The mobile station scans a first carrier within multiple carriers, and checks whether a P-SCH is broadcasted on the first carrier. If a P-SCH is broadcasted on the first carrier, the mobile station retrieves recommended information in the P-SCH, selects a second carrier within the carriers based on the recommended information, and scans for the second carrier.

In an embodiment of a method for network entry management, multiple carriers are broadcasted by a base station, wherein the carriers include at least a first carrier including at least one P-SCH, and does not include an S-SCH, and the P-SCH may be used for timing acquisition and frequency synchronization, and the S-SCH may be used for a cell identification. The first carrier is scanned by a mobile station, and it is checked whether a P-SCH is broadcasted on the first carrier. If a P-SCH is broadcasted on the first carrier, it is checked whether an S-SCH is broadcasted on the first carrier. If no S-SCH is broadcasted on the first carrier, a second carrier broadcasted by the base station is scanned by the mobile station.

In an embodiment of a method for network entry management for use in a base station, multiple carriers are broadcasted, wherein the carriers are classified into fully configured carriers and partially configured carriers. The fully configured carrier includes at least one P-SCH and at least one S-SCH, and the partially configured carrier includes at least one P-SCH, and does not include the S-SCH. The P-SCH may be used for timing acquisition and frequency synchronization, and the S-SCH may be used for cell identification.

In an embodiment of a method for network entry management for use in a mobile station, a first carrier within multiple carriers is scanned. It is checked whether a P-SCH is broadcasted on the first carrier. If a P-SCH is broadcasted on the first carrier, it is checked whether an S-SCH is broadcasted on the first carrier. If no S-SCH is broadcasted on the first carrier, recommended information in the P-SCH is retrieved, a second carrier within the carriers is selected based on the recommended information, and the second carrier is scanned.

In some embodiments, the recommended information may be a channel space or a coarse raster, or a carrier configuration. The carrier configuration indicates whether a band including the first carrier has a fully configured carrier, and the fully configured carrier is in a higher frequency, or the fully configured carrier is in a lower frequency.

Methods for network entry management may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Systems and methods for network entry management are provided.

Figure 1:
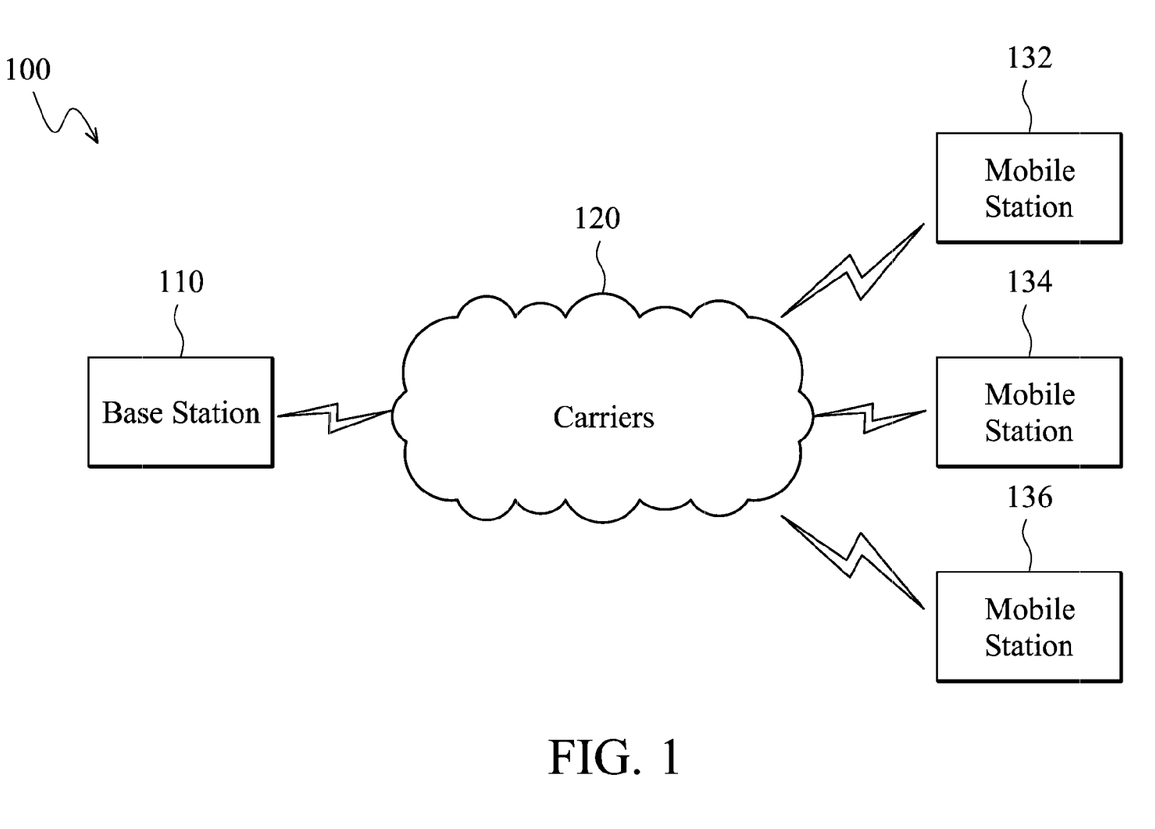
FIG. 1 is a schematic diagram illustrating an embodiment of a system for network entry management of the invention.
Figure 2:
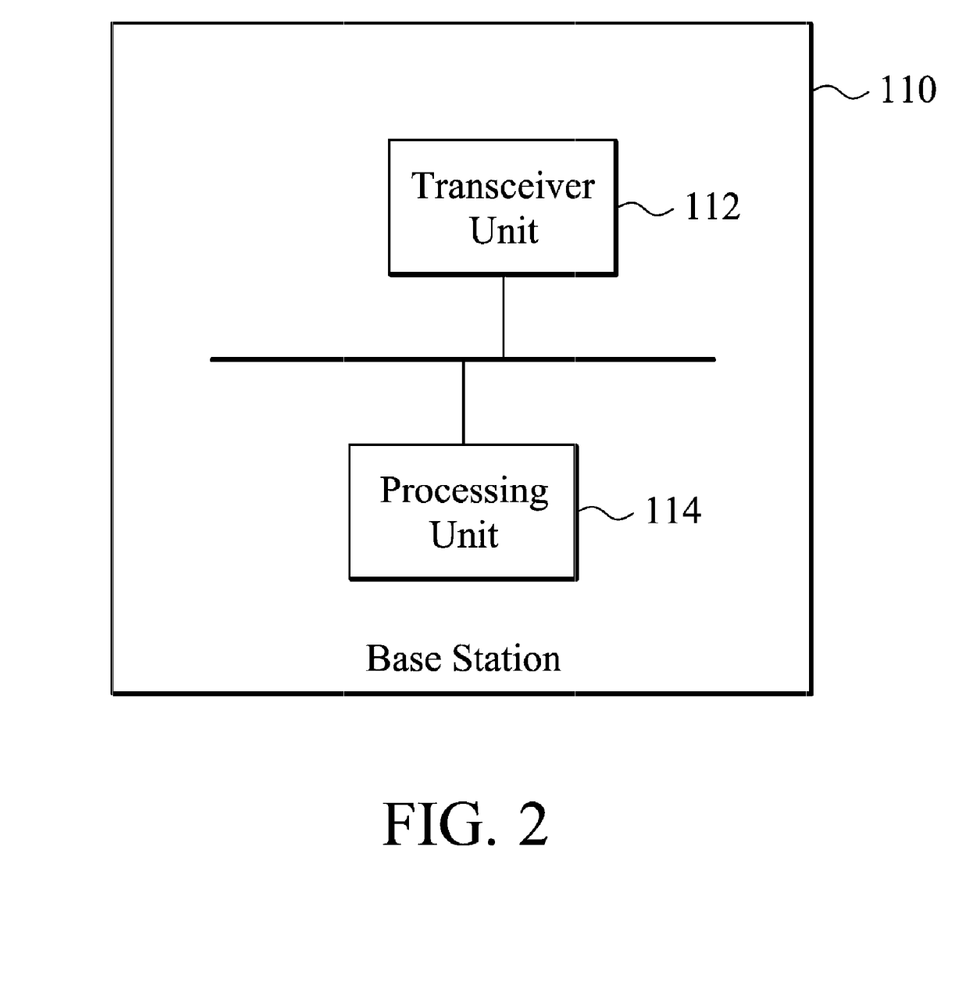
FIG. 2 is a schematic diagram illustrating an embodiment of a base station of the invention.

FIG. 1 is a schematic diagram illustrating an embodiment of a system for network entry management of the invention. The system for network entry management 100 comprises a base station 110 and a plurality of mobile stations (132, 134 and 136). FIG. 2 is a schematic diagram illustrating an embodiment of a base station of the invention. The base station 110 may be an electronic device implemented with a multi-carrier system. It is understood that, the basic protocols, concept and related terminologies of the multi-carrier system are well known in the art, and omitted here. The base station 110 comprises a transceiver unit 112 and a processing unit 114. The processing unit 114 can enable the transceiver unit 112 to broadcast multiple carriers 120 comprising fully configured carriers and partially configured carriers. It is understood that, the partially configured carrier may have different names, such as an extension carrier, in various systems. In the present application, the partially configured carrier is used for explanation, and the present invention is not limited thereto. Details of fully configured carriers and partially configured carriers will be discussed later.

Figure 3:
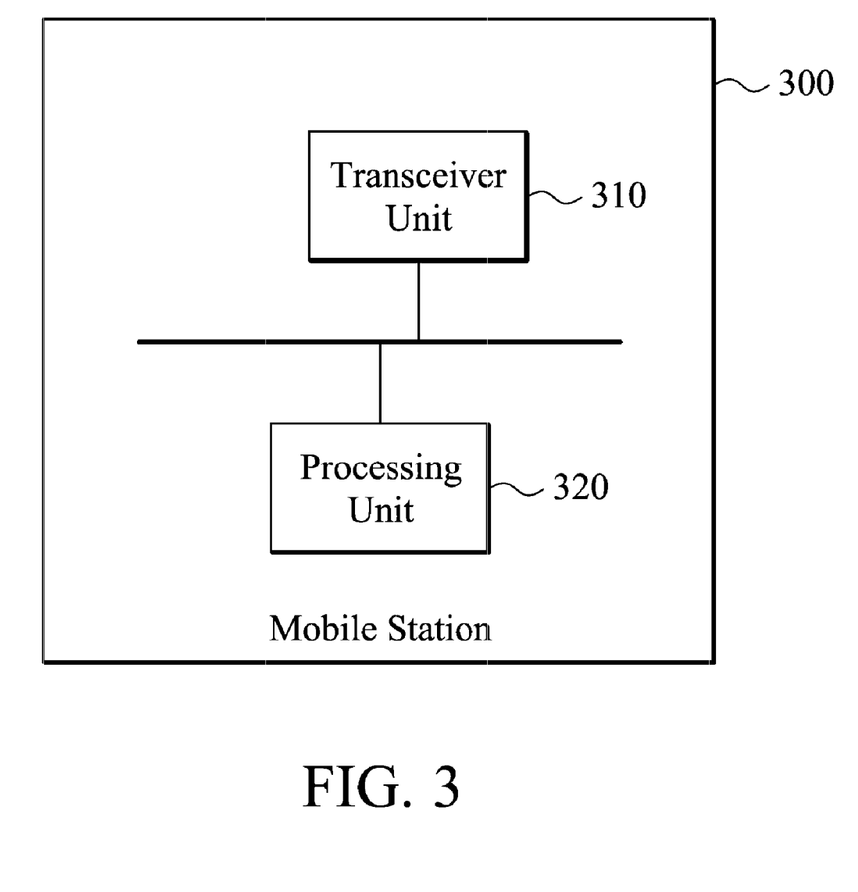
FIG. 3 is a schematic diagram illustrating an embodiment of a mobile station of the invention.

FIG. 3 is a schematic diagram illustrating an embodiment of a mobile station of the invention. The mobile station 300 may be an electronic device having wireless communications capability. The mobile station 300 comprises a transceiver unit 310 and a processing unit 320. The processing unit 320 can scan carriers via the transceiver unit 310, perform related analysis with the carriers, and accordingly lock onto a network provided by the base station 110. Related details will be discussed further in the following paragraphs.

As described, the system is a multi-carrier system with fully configured carriers and partially configured carriers. The fully configured carriers can operate standalone. The partially configured/extension carriers can not operate standalone, and can not be used for network entry. In the present invention, the hierarchical SCH composed of P-SCH, S-SCH, and BCH can be used for carrier configuration in the multi-carrier system. The P-SCH may be used for timing acquisition and frequency synchronization, and may be used for symbol boundary detection. The S-SCH may carry cell identity (cell ID) or partial cell ID information, e.g. Physical ID in 3GPP LTE. The S-SCH may be used for channel estimation. The BCH can carry system information, such as bandwidth, identity, frame configurations, location of control channels, and others.

Figure 4:
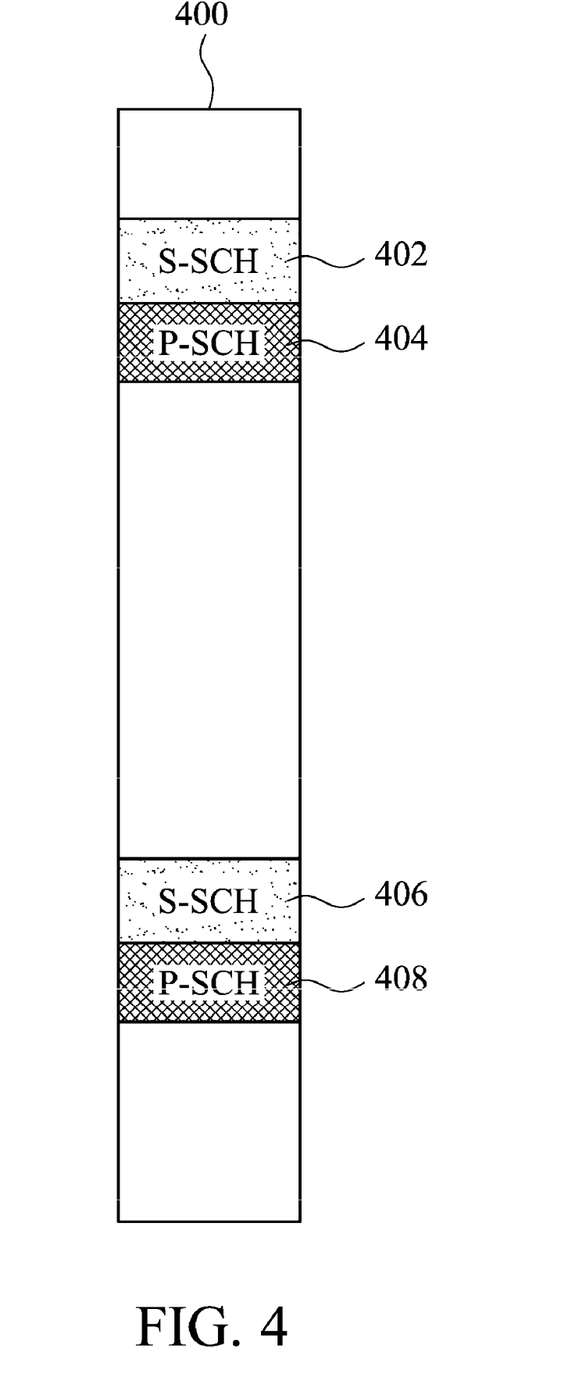
FIG. 4 is a schematic diagram illustrating an embodiment of a frame structure of a fully configured carrier of the invention.

In the present invention, the frame structure of the fully configured carrier comprises at least one P-SCH and at least one S-SCH. FIG. 4 is a schematic diagram illustrating an embodiment of a frame structure of a fully configured carrier of the invention. In the embodiment of FIG. 4, the fully configured carrier 400 is composed of S-SCHs (402 and 406) and P-SCHs (404 and 408). It is understood that, the fully configured carrier 400 in FIG. 4 is similar to that in conventional arts. A mobile station can detect both synchronization channels (P-SCH and S-SCH) in the fully configured carrier 400 and enter the network provided by the system.

Figure 5A:
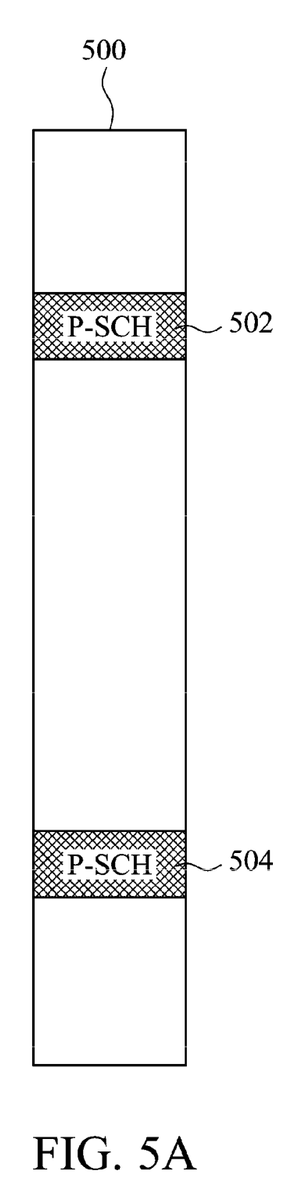
FIG. 5A is a schematic diagram illustrating an embodiment of a frame structure of a partially configured carrier of the invention.
Figures 5B, 5C:
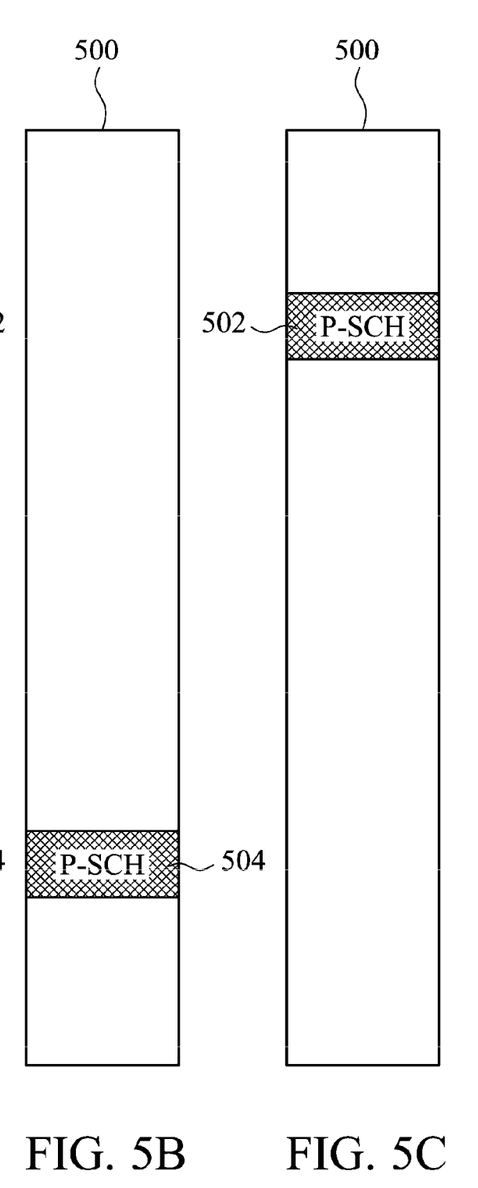
FIG. 5B is a schematic diagram illustrating another embodiment of a frame structure of a partially configured carrier of the invention.
FIG. 5C is a schematic diagram illustrating another embodiment of a frame structure of a partially configured carrier of the invention.

In the present invention, the frame structure of the partially configured carrier comprises at least one P-SCH, and has no S-SCH. FIG. 5A is a schematic diagram illustrating an embodiment of a frame structure of a partially configured carrier of the invention. As shown in FIG. 5A, the partially configured carrier 500 is composed of P-SCHs (502 and 504). Since the S-SCH is removed from the partially configured carrier 500, a mobile station cannot detect the S-SCH through the carrier, and will ignore the carrier. To save radio resources for data transmission, in some embodiments, the system can transmit data at the position for S-SCH in the partially configured carrier since no S-SCH should be transmitted in the partially configured carrier. Further, in some embodiments, if several P-SCHs are within a frame, the amount of P-SCHs can also be adjusted to save radio resources for data transmission. For example, the P-SCH 502 in the partially configured carrier 500 of FIG. 5A can be removed, as shown in FIG. 5B. For example, the P-SCH 504 in the partially configured carrier 500 of FIG. 5A can be removed, as shown in FIG. 5C. Similarly, the position of the removed P-SCH can be used to transmit data.

It is understood that, in some embodiments, the P-SCH may have 2 times time domain repeated characteristic, and the P-SCH may use a Zadoff Chu code or generalized chirp like code. In some embodiments, the P-SCH can be applied in frequency domain interleave preambles, and an FDM/CDM based synchronization channel. It is understood that, in some embodiments, the P-SCH may use MIMO schemes, such as cyclic delay diversity and/or cluster-based phase rotation. It is understood that, in some embodiments, the S-SCH may have 3 times time domain repeated characteristics or 5 times time domain repeated characteristics. Similarly, the S-SCH may use a Zadoff Chu code or generalized chirp like code. In some embodiments, the S-SCH may use the MIMO scheme, such as cyclic delay diversity, or the FSTD MIMO scheme.

It is noted that, in some embodiments, the P-SCH in the partially configured carrier may comprise recommended information. The recommended information may be a channel space, a coarse raster, or a carrier configuration. In the channel space, for example, when three sequences are used for the P-SCH in the partially configured carrier, one sequence can be set as a first channel space, another sequence can be set as a second channel space, and the other sequence can be set as a third channel space. In an example of 3GPP LTE, one sequence can be set as a 1.4 MHz channel space, another sequence can be set as a 3 MHz channel space, and the other sequence can be set as a 5 MHz/10 MHz/20 MHz channel space. A mobile station can select and scan for another carrier based on the referent channel space to largely avoid redundant carrier scan. It is noted that, in the LTE case, the channel space can be further restricted to be used in the current band or adjacent carriers. In a coarse raster, for example, when three sequences are used for the P-SCH in the partially configured carrier, one sequence can be set as a small bandwidth scanning step, another sequence can be set as a medium bandwidth scanning step, and the other sequence can be set as a large bandwidth scanning step. For example, one sequence can be set as a 1.4 MHz coarse raster, another sequence can be set as a 3 MHz coarse raster, and the other sequence can be set as a 5 MHz coarse raster. In some embodiments, the center frequency can be defined to be allocated between +XHz and −XHz to the scanned frequency. In a carrier configuration, for example, when three sequences are used for the P-SCH in the partially configured carrier, one sequence can be set to indicate that no fully configured carrier is in a band, another sequence can be set to indicate that the fully configured carrier is in a higher frequency, and the other sequence can be set to indicate that the fully configured carrier is in a lower frequency. In some embodiments, the P-SCH in the partially configured carrier may indicate that a carrier currently being scanned is a partially configured carrier. The mobile station can select and scan for another carrier based on the recommended information retrieved from the P-SCH in the partially configured carrier. Related details will be discussed later.

Figure 6:
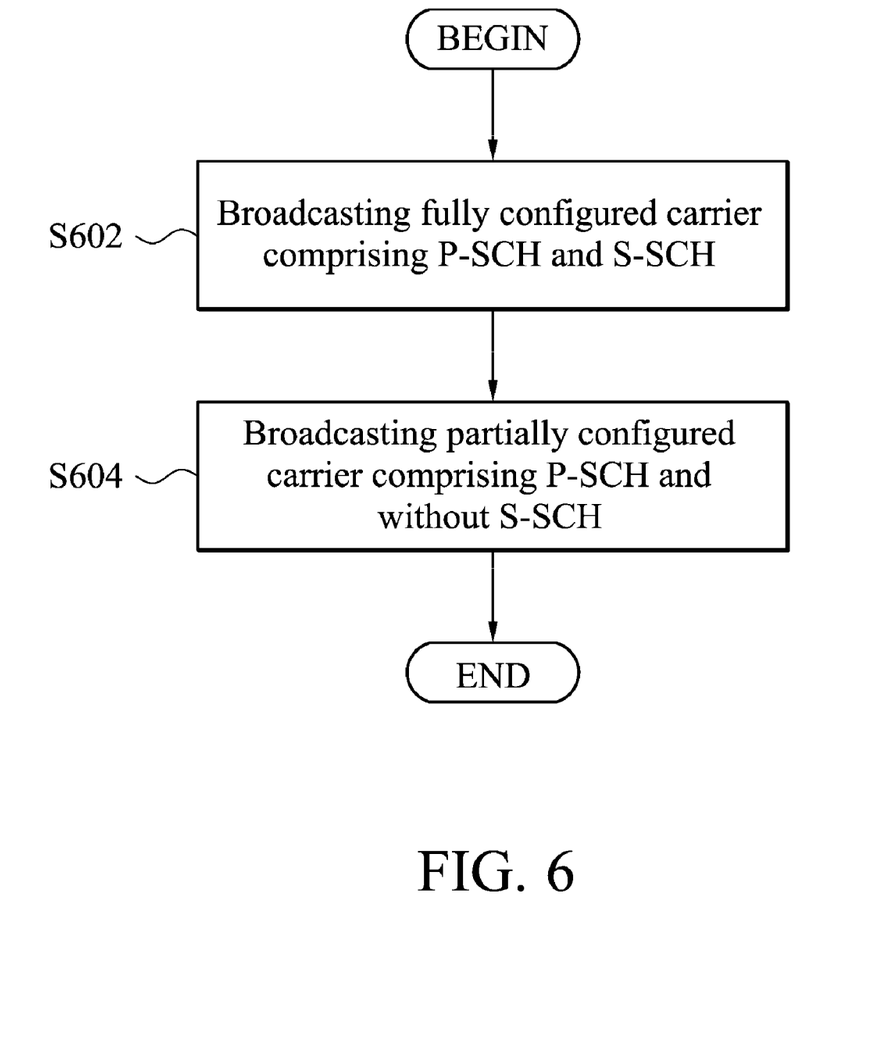
FIG. 6 is a flowchart of an embodiment of a method for network entry management for a base station of the invention.

FIG. 6 is a flowchart of an embodiment of a method for network entry management for a base station of the invention.

In step S602, the base station broadcasts at least one fully configured carrier. As described, the fully configured carrier comprises at least one P-SCH and at least one S-SCH. It is noted that, in some embodiment, the base station will also broadcast system information, such as bandwidth, identity, frame configurations, location of control channels, and others in a BCH. In step S604, the base station broadcasts at least one partially configured carrier. Similarly, the partially configured carrier comprises at least one P-SCH, and has no S-SCH. Further, in some embodiment, the base station can further embed recommended information and/or an indication into the P-SCH in the partially configured carrier. Similarly, the recommended information may be a channel space, a coarse raster, or a carrier configuration, and the indication may indicate that a carrier is currently being scanned is a partially configured carrier.

Figure 7:
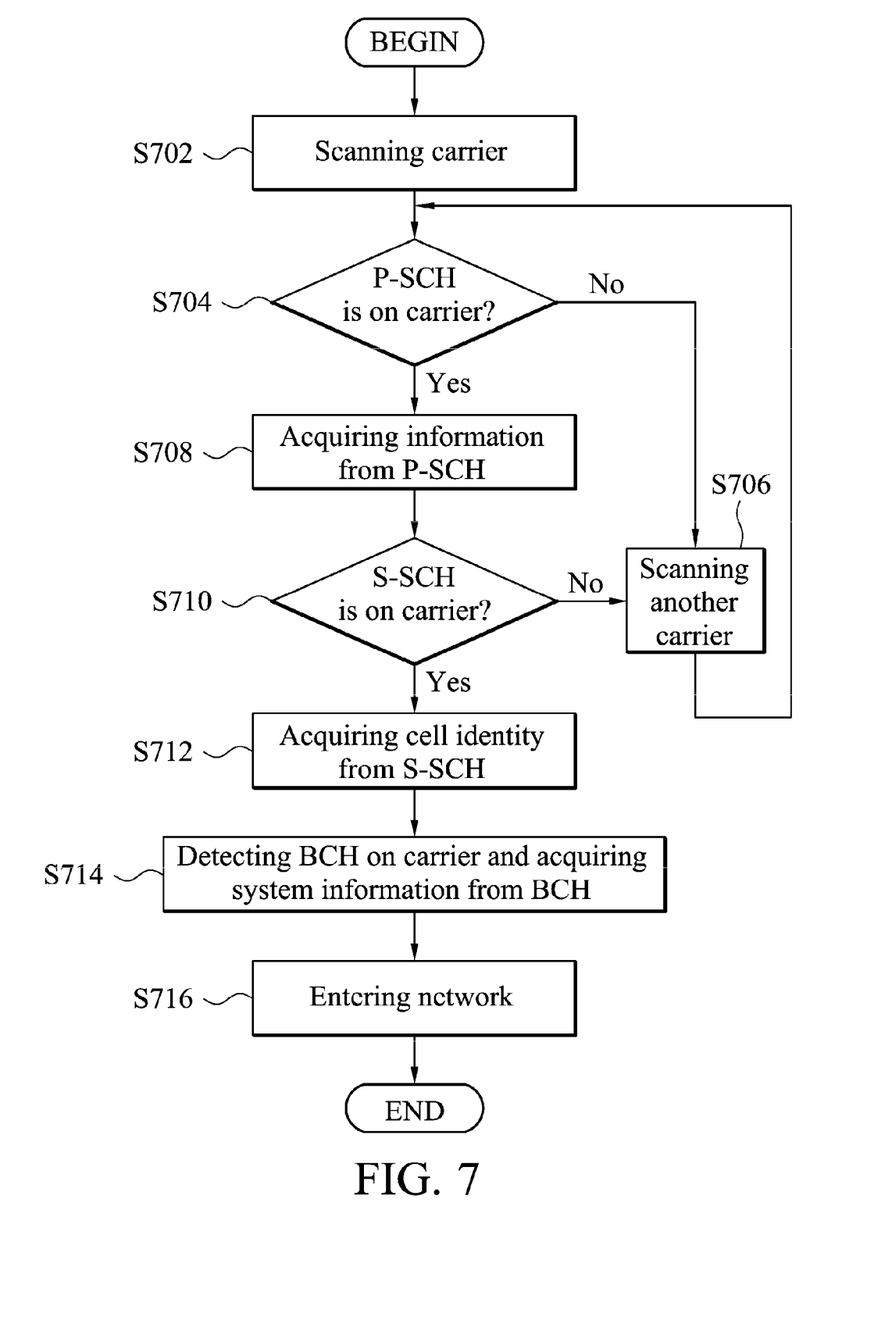
FIG. 7 is a flowchart of an embodiment of a method for network entry management for a mobile station of the invention.

FIG. 7 is a flowchart of an embodiment of a method for network entry management for a mobile station of the invention. In the embodiment, the partially configured carrier comprises at least one P-SCH, and has no S-SCH.

In step S702, the mobile station scans for a carrier within the carriers broadcasted by a base station. In step S704, it is determined whether a P-SCH is within the carrier. If no P-SCH is broadcasted on the carrier (No in step S704), in step S706, the mobile station scans for another carrier, and the procedure goes to step S704. If at least one P-SCH is broadcasted on the carrier (Yes in step S704), in step S708, the mobile station acquires information from the P-SCH to synchronize system timing and center frequency. In step S710, it is determined whether an S-SCH is within the carrier. If no S-SCH is broadcasted on the carrier (No in step S710), in step S706, the mobile station scans for another carrier, and the procedure goes to step S704. It is understood that, as described, since the S-SCH is removed from the partially configured carrier broadcasted by the base station, the mobile station cannot detect the S-SCH through the carrier, and will ignore the carrier. If at least one S-SCH is broadcasted on the carrier (Yes in step S710), in step S712, the mobile station acquires a cell identity from the S-SCH. Then, in step S714, the mobile station detects the BCH from the carrier, and retrieves system information, such as bandwidth, identity, frame configurations, location of control channels, and others from the BCH, and in step S716, accordingly enters a network provided by the base station implementing the multi-carrier system.

Figure 8:
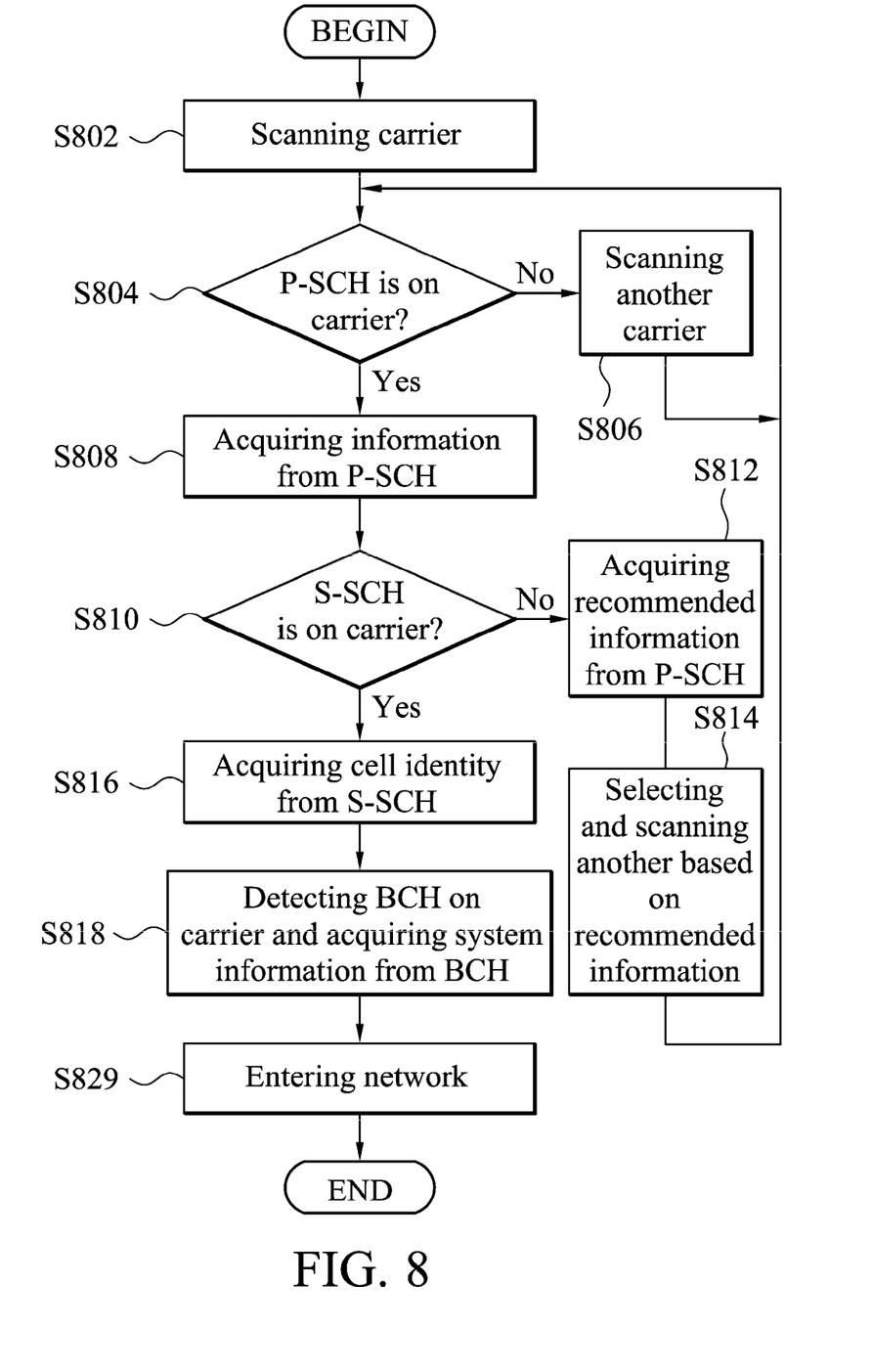
FIG. 8 is a flowchart of another embodiment of a method for network entry management for a mobile station of the invention.

FIG. 8 is a flowchart of another embodiment of a method for network entry management for a mobile station of the invention. In the embodiment, the partially configured carrier comprises at least one P-SCH, and has no S-SCH, and the mobile station can select and scan for another carrier based on recommended information recorded in the P-SCH in the partially configured carrier.

In step S802, the mobile station scans for a carrier within the carriers broadcasted by a base station. In step S804, it is determined whether a P-SCH is within the carrier. If no P-SCH is broadcasted on the carrier (No in step S804), in step S806, the mobile station scans for another carrier, and the procedure goes to step S804. If at least one P-SCH is broadcasted on the carrier (Yes in step S804), in step S808, the mobile station acquires information from the P-SCH to synchronize system timing and center frequency. In step S810, it is determined whether an S-SCH is broadcasted on the carrier. If no S-SCH is broadcasted on the carrier (No in step S810), in step S812, the mobile station acquires recommended information from the P-SCH in the partially configured carrier, and in step S814, selects and scans another carrier based on the retrieved recommended information, and the procedure goes to step S804. Similarly, the recommended information may be a channel space, a coarse raster, or a carrier configuration. If at least one S-SCH is broadcasted on the carrier (Yes in step S810), in step S816, the mobile station acquires a cell identity from the S-SCH. Then, in step S818, the mobile station detects the BCH from the carrier, and retrieves system information, such as bandwidth, identity, frame configurations, location of control channels, and others from the BCH, and in step S820, accordingly enters a network provided by the base station implementing the multi-carrier system.

As described, the P-SCH in the partially configured carrier may have an indication to indicate whether the carrier is a partially configured carrier. In some embodiments, once the indication in the P-SCH in a carrier is detected by the mobile station, the mobile station will leave the carrier and scan another carrier. It is understood that, in some embodiments, the mobile station scans another carrier based on the recommended information.

Therefore, the systems and methods for network entry management can provide a hierarchical synchronization channel design for a multi-carrier system to reduce network entry latency and save radio resources.

Methods for network entry management, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed:

1. A system for network entry management, comprising:
a base station broadcasting multiple carriers, wherein the carriers comprise a first carrier including at least one primary synchronization channel (P-SCH) and does not include a secondary synchronization channel (S-SCH); and
a mobile station scanning the first carrier, checking whether a P-SCH is broadcasted on the first carrier, if a P-SCH is broadcasted on the first carrier, checking whether an S-SCH is broadcasted on the first carrier, and if no S-SCH is broadcasted on the first carrier, scanning a second carrier broadcasted by the base station.

2. The system of claim 1, wherein the P-SCH comprises recommended information, and when no S-SCH is broadcasted on the first carrier, the mobile station further selects the second carrier based on the recommended information, and scans for the second carrier.

3. The system of claim 2, wherein the recommended information comprises a channel space, a coarse raster, or a carrier configuration, wherein the carrier configuration indicates whether a band including the first carrier has a fully configured carrier, and the fully configured carrier is in a higher frequency, or the fully configured carrier is in a lower frequency.

4. The system of claim 1, wherein the mobile station further scans a third carrier within the carriers broadcasted by the base station, and checks whether a P-SCH is broadcasted on the third carrier, if a P-SCH is broadcasted on the third carrier, checks whether an S-SCH is broadcasted on the third carrier, if an S-SCH is broadcasted on the third carrier, detects a broadcasting channel (BCH) within the third carrier, acquires system information from the BCH, and accordingly enters a network provided by the base station.

5. The system of claim 4, wherein the first carrier is a partially configured carrier and the third carrier is a fully configured carrier.

6. A method for network entry management for use in a base station and a mobile station, comprising:
broadcasting multiple carriers by the base station, wherein the carriers comprise a first carrier including at least one primary synchronization channel (P-SCH) and does not include a secondary synchronization channel (S-SCH);
scanning the first carrier by the mobile station;
checking whether a P-SCH is broadcasted on the first carrier by the mobile station;
if a P-SCH is broadcasted on the first carrier, checking whether an S-SCH is broadcasted on the first carrier by the mobile station, and
if no S-SCH is broadcasted on the first carrier, scanning a second carrier broadcasted by the base station by the mobile station.

7. The method of claim 6, wherein the P-SCH comprises recommended information, and when no S-SCH is broadcasted on the first carrier, the method further comprises:
selecting the second carrier based on the recommended information by the mobile station; and
scanning the second carrier by the mobile station.

8. The method of claim 7, wherein the recommended information comprises a channel space or a coarse raster, or a carrier configuration, wherein the carrier configuration indicates whether a band including the first carrier has a fully configured carrier, and the fully configured carrier is in a higher frequency, or the fully configured carrier is in a lower frequency.

9. The method of claim 6, further comprising:
scanning a third carrier within the carriers broadcasted by the base station by the mobile station;
checking whether a P-SCH is broadcasted on the third carrier by the mobile station;
if a P-SCH is broadcasted on the third carrier, checking whether an S-SCH is broadcasted on the third carrier by the mobile station; and
if an S-SCH is broadcasted on the third carrier, detecting a broadcasting channel (BCH) within the third carrier, obtaining network information from the BCH, and accordingly entering a network provided by the base station by the mobile station.

10. The method of claim 9, wherein the first carrier is a partially configured carrier and the third carrier is a fully configured carrier.

* * * * *